United States Patent

Rees et al.

Patent Number: 5,229,787
Date of Patent: Jul. 20, 1993

[54] COLOR PRINTER

[75] Inventors: James D. Rees, Pittsford; Thomas J. Hammond, Penfield; James M. Casella, Webster, all of N.Y.

[73] Assignee: Xerox Corporation, Stamford, Conn.

[21] Appl. No.: 948,565

[22] Filed: Sep. 23, 1992

[51] Int. Cl.⁵ ............................................. G03G 15/01
[52] U.S. Cl. ................................ 346/107 R; 346/108; 346/157; 355/327
[58] Field of Search ................... 346/107 R, 108, 136, 346/157; 355/317, 326, 327, 212

[56] References Cited

U.S. PATENT DOCUMENTS

| | | | |
|---|---|---|---|
| 4,252,432 | 2/1981 | Ophey | 355/14 R |
| 4,611,901 | 9/1986 | Kohyama et al. | 355/4 |
| 4,752,804 | 6/1988 | Ohno | 355/3 R |
| 4,791,452 | 12/1988 | Kasai et al. | 355/14 D |
| 4,801,978 | 1/1989 | Lama et al. | 355/69 |
| 4,803,515 | 2/1989 | Hoshino et al. | 355/4 |
| 4,833,503 | 5/1989 | Snelling | 355/259 |
| 4,901,110 | 2/1990 | Tompkins et al. | 355/212 |
| 4,933,727 | 6/1990 | Mizuma et al. | 355/327 |
| 4,965,597 | 10/1990 | Ohigashi et al. | 346/157 |

Primary Examiner—Joan H. Pendegrass

[57] ABSTRACT

The present invention relates to a color printer which forms multiple latent images on the surface of a belt type photoreceptor in a single pass. The invention enables the placement of imaging stations on both a tensioned and non-tensioned side of the belt. On the non-tensioned, an asynchronous line at a time printer such as an LED print bar is used to form the latent image in response to video data signals. On the tensioned side of the belt, either synchronous type imagers, such as laser ROSs or asynchronous imagers such as LED print bars may be located to form the latent image. The leading edges of each image frame are registered according to known methods. Each scan line within an image frame is registered by comparing the belt speed beneath each of the imagers and generating a correction signal to the asynchronous print bar. Since the print bar operates asynchronously, it is possible to vary the pulsed line write time so as to register each of the scan lines formed by the print bar with the scan line being formed by the imagers at the tensioned side of the belt.

12 Claims, 5 Drawing Sheets

COLOR PRINTER

BACKGROUND OF THE INVENTION AND MATERIAL DISCLOSURE STATEMENT

The present invention relates generally to a digital printer and, more particularly, to a color digital printer using imaging stations adjacent both the tensioned and non-tensioned sides of a photoreceptor belt.

In recent years, digital color printers have been increasingly utilized to produce output copies from input video data representing original image information. The printer uses a plurality of imagers, either raster output scanners (ROSs) or LED print bars, to expose the charged portions of a photoconductive member to record an electrostatic latent image thereon. Generally, a raster output scanner incorporates a laser for generating a collimated beam of monochromatic radiation. The laser beam is modulated in conformance with the image information. The modulated beam is incident on a scanning element, typically a rotating polygon having mirrored facets. The light beam is reflected from each facet and thereafter focused to a spot on the photosensitive member. The rotation of the polygon causes the spot to scan linearly across the photoconductive member in a fast scan (i.e., line scan) direction. Meanwhile, the photoconductive member is advanced relatively more slowly in a slow scan direction which is orthogonal to the fast scan direction. In this way, the beam scans the recording medium with a plurality of scan lines in a raster scanning pattern. The time between the formation of each scan line is constant due to the rotating nature of the polygon. Thus, such operation is characterized as synchronous. The light beam is intensity-modulated in accordance with an input image serial data stream, at a rate such that individual picture elements ("pixels") of the image represented by the data stream are exposed on the photoconductive member to form a latent image, which is then transferred to an appropriate image receiving medium such as paper. In an LED print bar system, video data is applied to drive circuits which control the instant on/off time of the individual diodes comprising the print bar. A modulated output is coupled through a linear lens array onto the surface of the photoreceptor medium to form the image scan lines. Each image line is formed instantly; the time between scan lines can be constant as in the case of the ROS using a polygon scanner, or can vary if desired. The latter type of operation is characterized as synchronous.

Color digital printers may operate in either a single pass or multiple pass mode. In a single pass, process color system, three imagers are positioned adjacent to a moving photoreceptor surface and are selectively energized to create successive image exposures, one for each of the three process colors, cyan, magenta and yellow. A fourth black imager is usually added. A color digital printer may also operate in a highlight color mode wherein one or two colors and black are exposed.

In a multiple pass system, each image area on the photoreceptor surface must make at least three revolutions (passes) relative to the transverse scan lines formed by the modulated beam generated by the imagers. With either system, each image is typically formed within a tight tolerance of ±0.05 mm. Each color image must be registered in both the photoreceptor process direction X (skew registration) and in the direction Y parallel to the process direction (referred to as fast scan or transverse registration). Registration in the transverse direction of a single pass ROS imager system is known in the prior art and registration techniques are disclosed in copending U.S. Ser. No. 07/635,835 filed on Jan. 3,1991, and U.S. Ser. No. 07/807,927 filed on Dec. 16, 1991, both assigned to the same assignee as the present invention. Registration techniques for LED print bar imagers are disclosed in U.S. Ser. No. 07/807,931 and U.S. Ser. No. 07/862,150. The contents of these applications are hereby incorporated by reference. Further references located during a prior art search are briefly summarized below.

U.S. Pat. No. 4,933,727 to Mizuma et al. discloses a color recording apparatus which forms color image precisely overlapping each other in a record medium. Record medium conveying motion and latent image forming motion are precisely synchronized with each other by a predetermined timing relation, so as to have the forward movements of the record medium coincide to the start of the electrostatic latent image forming operation to form an electrostatic latent image on a photoconductor. A photoconductor belt 211 is designed in a vertical manner as shown in FIGS. 1-2. See Col. 3, line 66–Col. 4, line 25.

U.S. Pat. No. 4,752,804 to Ohno discloses a color image forming apparatus in which toner images are successively transferred from a plurality of image bearing members to a predetermined transfer material. A control system is included in order that a peripheral speed of the imaging member is constant. The control of the constant speed is effected by a pulse generated from an encoder by a revolution of a drive motor which is counted at a predetermined time. A control signal is output from a driver to the motor through a motor control CPU to a D/A converter so that the revolution of the motor coincides with a predetermined pulse number. The apparatus provides a detecting and coinciding means which detects a phase angle during rotation of the image bearing members.

U.S. Pat. No. 4,965,597 to Ohigashi et al. discloses a color image recording apparatus which superimposes a plurality of images having different colors to form a composite image. Registration marks are formed on a recording medium at equal pitches as it is transported through an image formation device. The apparatus is comprised: (1) a sensor for sensing the registration marks; (2) an edge sensor; and (3) a timing control means for controlling an energizing means at a time a latent image is formed on a recording medium. Each pitch between the registration marks is measured at the sensor means. Steps are taken each time the registration mark is sensed to detect the discrepancy between the number of lines of the latent image formed up to the time the registration mark is sensed, and the number of lines established when the registration marks are formed in the beginning.

U.S. Pat. No. 4,252,432 to Ophey discloses a control system for an electrophotographic copier having an endless photoconductive belt. The photoconductive belt has at least one marking which excites a sensor each time the marking passes a fixed point in the belt path. The belt is provided with: (1) a first drive means for driving the photosensitive belt and for moving the belt into a first section alternately at a high constant speed when scanning and exposing, and at a low constant speed or stopping when exposing and scanning are returned to an original position; (2) a second drive means for moving the belt in a second section at a constant speed. See col. 2, lines 26–58. The movement of the belt is measured electronically by a pulse generator coupled to a belt transport roller and a counter.

U.S. Pat. No. 4,803,515 to Hoshino et al. discloses an image forming apparatus wherein a time interval is required for an image bearing member to move from a latent image forming position to a transfer position. The time interval can be an integer multiple of a period of a drive non-uniformity which is inherent in a driver.

U.S. Pat. No. 4,901,110 to Tompkins et al. discloses an electrophotographic print engine with a photosensitive belt stretched over a plurality of rollers such that a developing position on the belt is disposed in a vertical plane.

U.S. Pat. No. 4,801,978 to Lama et al. discloses a printer which uses an encoder to detect spatial displacements of indicia affixed to a photoreceptor surface to adjust on/off timing of the write bars in order to adjust for effects of photoreceptor vibration.

These prior art applications are characterized by having imager stations, either ROS or print bars, on the same side of a photoreceptor belt. The belt is driven around a main drive roller, which is driven by a synchronous speed motor. The belt system requires that a tension roller be added to maintain the belt in a flat orientation throughout its rotation. The belt thus acquires a tensioned and non-tensioned instant surface, depending upon its location relative to the drive and tension rollers. With this arrangement, the belt surface speed varies at different points, depending upon the rotation position of the drive roller and motion of the tension roller. As will be seen, the tensioned side of the belt has a speed which varies in a synchronous or periodic fashion. The speed of the belt on the non-tension or slack side, varies in a non-synchronous or non-periodic fashion. This situation is shown in FIG. 1.

Figure 1:
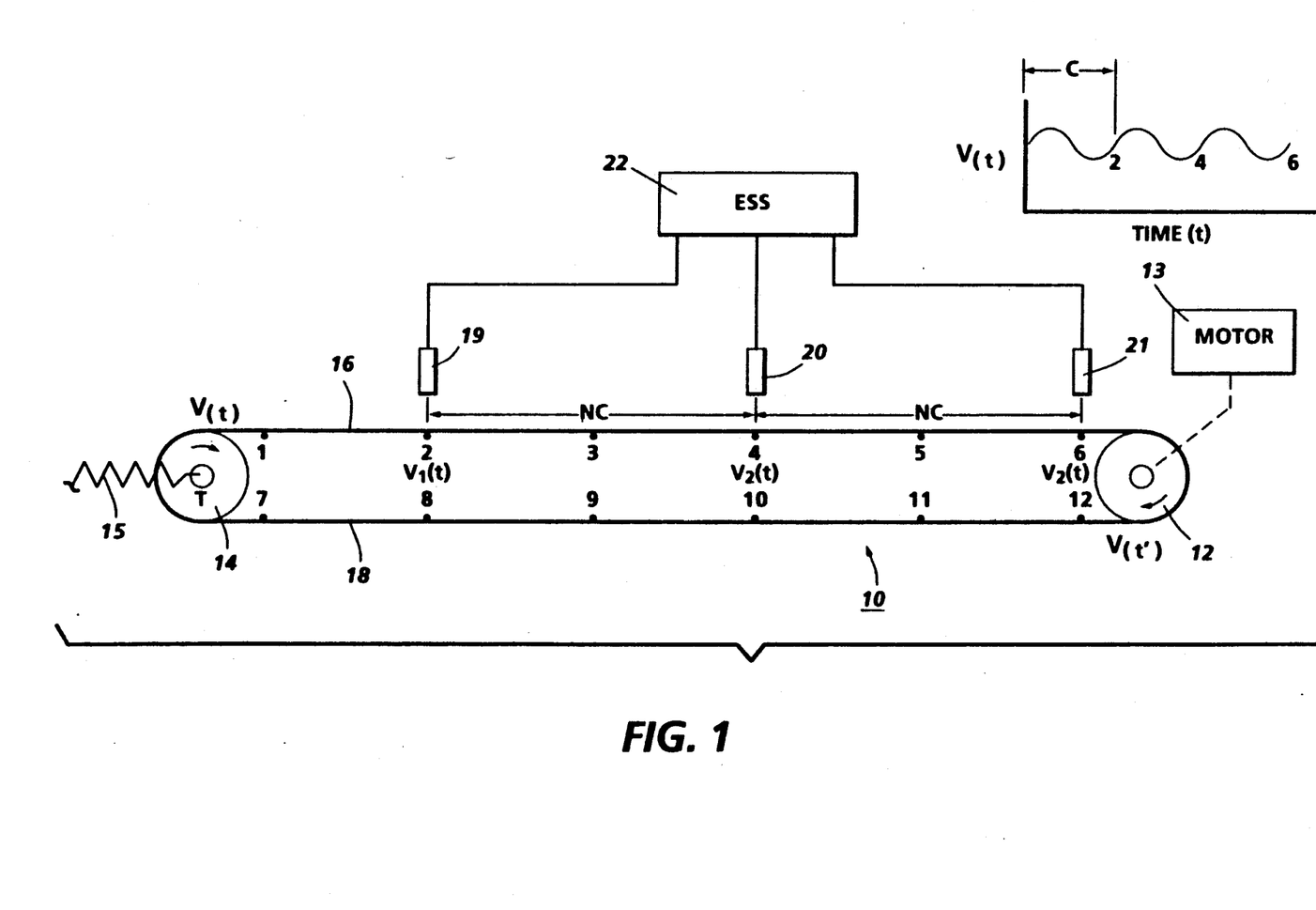
FIG. 1 shows the phase synchronicity of points on the tensioned side of a photoreceptor belt.

FIG. 1 shows a configuration of a photoreceptor belt 10 being driven by a drive roller 12, rotated in the indicated direction by a synchronous speed motor 13. Roller 14 provides tension to the belt by a spring 15 or equivalent tensioning means and maintains it in a generally flat orientation. In the embodiment shown, the top surface 16 of belt 10 is the tensioned side, while the bottom surface 18 is the non-tensioned side. In a single pass color system, two or more imagers are required to be located adjacent the belt surface (two or more imagers are used in highlight color systems, usually four in process color). Belt 10 will have a number of exposure frames or pitches available to be written on by the imagers. The velocity of the belt, V(t), at the tensioned side of the belt, varies due to an inherent runout of the drive roller. Since the drive roller runout is periodic over the circumference, the resulting velocity variation is also periodic with the drive roller circumference. As shown by the sketch, the variation is periodic with a period equal to the circumference of the drive roller 12. The tensioned side of the belt thus has a speed which, at any given point, 1–6, etc., will vary depending upon its location at any given time. Thus, if points 2, 4 and 6, for example, are spaced apart by a distance which is an integer multiple of the period of the drive roller; e.g. a distance NC, where N is an integer (here N=1), the velocity of the belt at points 2, 4 and 6; e.g. $V_1(t)$, $V_2(t)$, $V_3(t)$ at any time t will be equal. The belt is thus characterized as having phase synchronicity at these points. If imagers 19, 20 and 21, driven by signals from Electronic Sub System (ESS) 22 are arranged to form scan lines at these three points, all points on the line formed at that portion of the belt will be moving at the same velocity; e.g. $V_1(t) = V_2(t) = V_3(t)$.

Considering next the velocity V(t') of the belt on the non-tensioned side 18 of the belt, the velocity at point 7–12 also has runout variations, due to the motion of tension roller 14. These variations are non-periodic and separation of imaging stations at any of points 7–12 by NC values will not establish the phase synchronicity possible with the imagers on the tensioned side of the belt.

It would be desirable to have the option of placing imaging stations anywhere along the periphery of a belt-type architecture. This arrangement would afford wider latitude in design of the housing and permit more efficient use of the available space. The problem, as set forth above, is the registration of images on the non-tensioned side of the belt with those on the tensioned side, while forming color images in a single pass. According to a first aspect of the present invention, a technique is provided which includes measurement of the actual speeds at synchronous operating imaging stations on the tensioned side of the belt and comparison of these speeds with the speeds at imaging stations at the non-tensioned side of the belt. Error signals are generated which represents the difference in the speeds. These signal are used to control the drive circuits to an asynchronous imager, such as an LED print bar, to control the pulsed on/off time (line write time) of the print bar and insure that the spacing between scan lines are the same value for all of the imagers. According to a second aspect of the invention, single pass color images are formed on the tensioned side of the belt which are not separated by an NC value. More particularly, the present invention relates to an imaging system for forming multiple registered latent images on a photoreceptor belt in a single pass comprising:

means for driving the belt around at least a drive roller having a circumference C and a tension roller thereby creating a tensioned and non-tensioned surface of the belt, at least one imaging station located on each said tensioned and non-tensioned surface of the belt, each imaging station including an imager which is addressed by video data signals to form a plurality of image scan lines across the surface of the photoreceptor moving therepast at a characteristic speed, at least one of said imagers comprising a print bar capable of asynchronous operation located adjacent the non-tensioned surface, means for comparing belt speed at each of said imaging stations and for generating a signal representing the difference between said signals, and control means for varying the write pulse time of said print bar so that said scan lines formed by said print bar are in registration with the scan lines formed by the imagers on the tensioned side of the belt.

DESCRIPTION OF THE INVENTION

Figure 2:
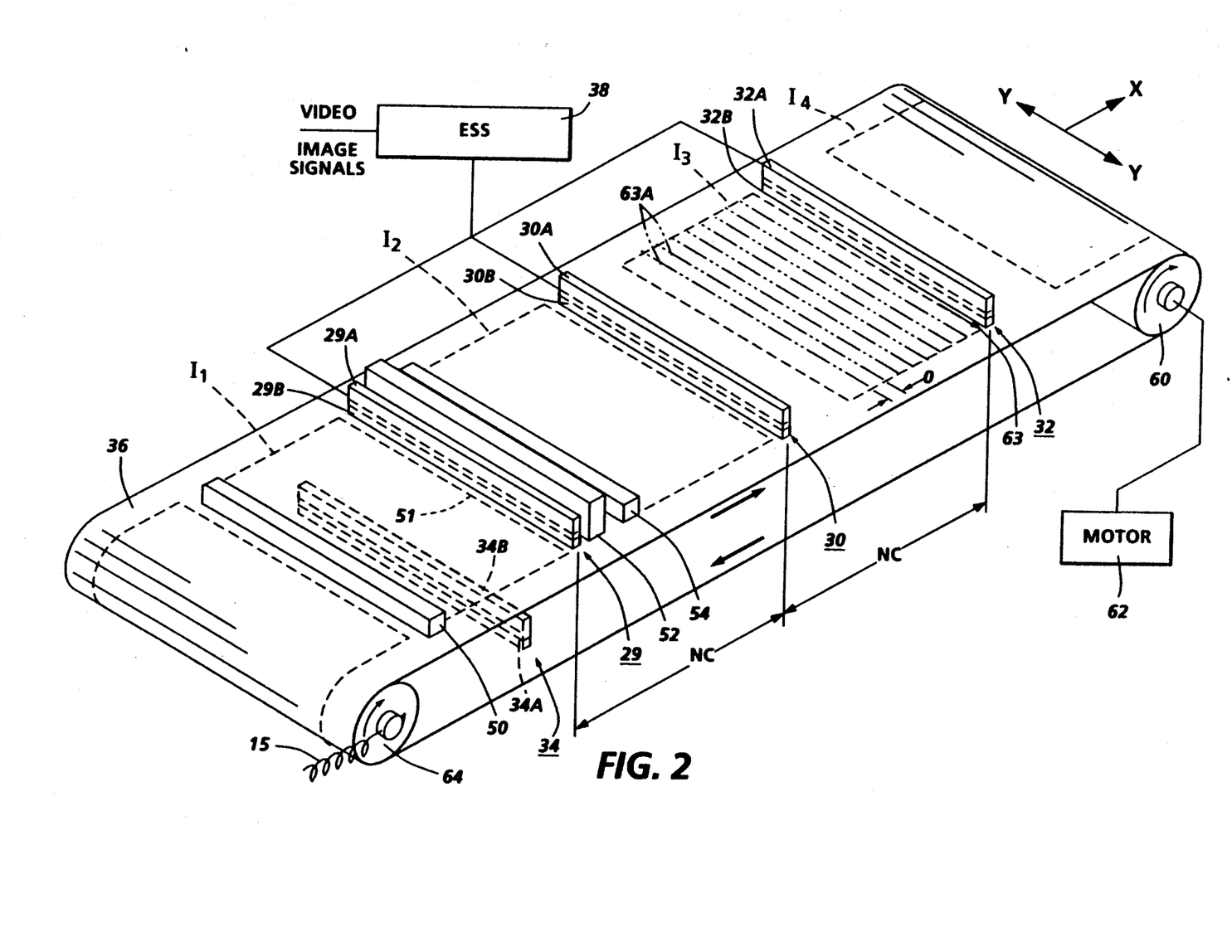
FIG. 2 shows a first embodiment of the invention with LED print bars located on both the tensioned and non-tensioned sides of the belt.

FIG. 2 shows a single pass, process color digital printer which includes four imaging stations 29, 30, 32, 34. Stations 29, 30, 32 are on the tensioned side of the belt; station 34 is on the non-tensioned side. Photoreceptor belt 36 has a length designed to accept an integral number of full image frames, represented by dashed lines. Each imaging station includes a print bar, which is selectively addressed by video image signals processed through Electronic Sub System (ESS) 38 to produce a modulated output which is coupled through a gradient index lens array onto the surface of previously charged belt 36. The exposure pattern begins when the leading edge of the image frame is detected by sensing a hole or target formed on the belt, according to techniques described in the referenced applications. The first line of image frame $I_3$, for example, is represented by a dashed arrow 63. The exposure pattern is formed of a plurality of closely spaced transverse scan lines 63A, shown with exaggerated longitudinal spacing in image area $I_3$. The spacing D between the scan lines in each image frame is a function of the speed of the belt at the imaging point divided by the pulsed write time. A charge device 50 creates an initial charge on image frame $l_1$; station 29, comprising LED print bar 29A and linear lens array 29B, creates modulated scan lines as the image frame passes therebeneath. The first color image is developed by developer 52 and the developed image is recharged by charging device 54. Image station 30 comprises LED print bar 30A and lens array 30B; station 32 comprises print bar 32A and lens array 32B and station 34 comprises print bar 34A and lens array 34B. Each print station is operated in conjunction with a charging device and developer station, which are omitted for purposes of clarity. When frame $l_4$ is exposed at station 34, a complete color image has been exposed, developed and is transferred to an output sheet at transfer station 58 (FIG. 3) and the belt cleaned at cleaning station 59. Further details of xerographic stations in a multiple exposure, single pass, system are disclosed in U.S. Pat. Nos. 4,833,503, 4,611,901 and 4,791,452, whose contents are hereby incorporated by reference.

Figure 3:
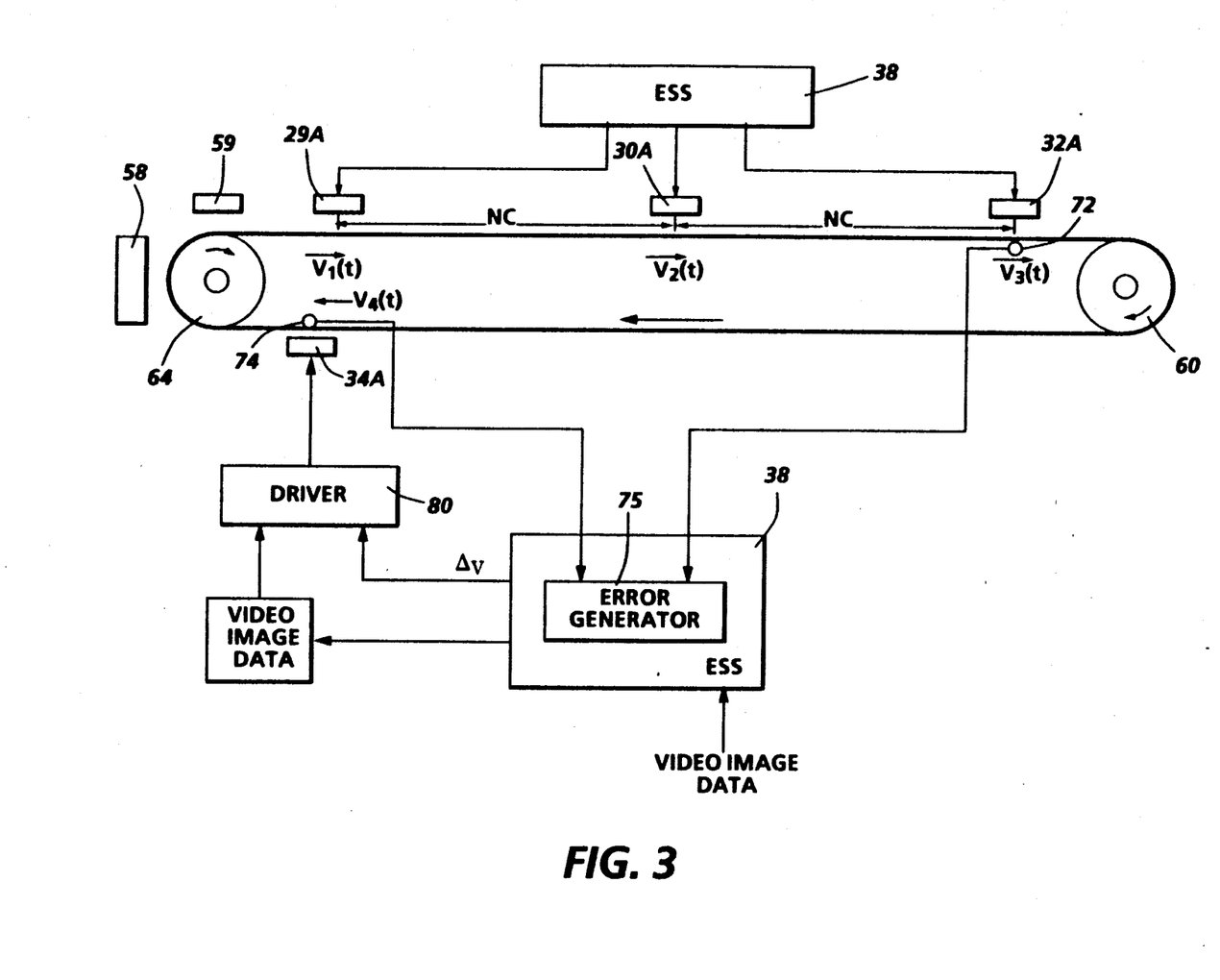
FIG. 3 shows the control circuitry associated with the FIG. 2 embodiment.

As shown in FIG. 2 and 3, belt 36 is driven by drive roller 60 in the indicated direction, by means of drive motor 62. Tension in the belt is taken up by tension roller 64. The actual speed of the belt at any point along its circumference is a function of three factors. Firstly, the rotational speed of the motor 62 drives roller 60 at a desired rotational speed. However, the drive roller radius is not exactly constant; it has some "runout". The variation in radius leads to periodic variations in the belt velocity. Thus, most points along the top, tensioned surface of the belt (for this example), unless compensation is made, would have slightly different velocities at each of the imaging stations at the same time t, resulting in misregistration of the images. This problem is resolved by locating each imaging station so that each station is separated by an integral multiple NC, where N is an integer and C is the circumference of the drive roller. Thus, the speed of the belt beneath each LED print bar 29A, 30A, 32A, are equal; e.g. $V_1(t) = V_2(t) = V_3(t)$. However, due to the motion of tension roller 64, the speed on the non-tensioned side of the belt is non-periodic. Thus, separation of the imaging station 34 from the station 29 by a distance NC would not result in the synchronicity of operation with stations 29, 30, 32. Further, the belt speed on the non-tensioned side of the belt, at a point beneath station 34, $V_4(t)$ is usually not equal to $V_1(t)$, $V_2(t)$, $V_3(t)$.

It is assumed that the imaging stations are corrected for other registration errors associated with belt conicity and skew, by sensing targets (not shown) which are formed on the belt and adjusting the start of scan for each image frame by controlling the drive circuits. Such a system is disclosed, for example, in aforementioned, co-pending U.S. application Ser. No. 07/862,150. As described in that application, the position of the first line of the first exposure frame, i.e. the line equal to line 63 in image frame $I_3$ of FIG. 2, is accurately determined. The first scan line of each of the other image frames are formed into pitch-to-pitch registration by sensing of targets associated with each frame.

The situation up to this point can, therefore, be summarized as follows: each LED print bar 29A, 30A, 32A, 34A will be activated so that the leading edge of each of the associated image frames will be in registration. Each print bar will be activated to create a latent electrostatic image associated with a specific color. Print bars 29A, 30A, 32A create a latent image on a portions of the belt which are moving at the same velocity at each image station so that scan lines are separated by the same scan distance; e.g. the distance between all scan lines 63A for each frame $I_1$, $I_2$, $I_3$, in FIG. 2 will be the same. Print bar 34, although activated so that the start of exposure lines 63 is in registration with the start of scan exposure line of imagers 29A, 30A, 32A, will form a latent image comprising scan lines which will not be in perfect registration with those in the other three exposure frames, due to the difference between velocity $V_4(t)$ and the other velocities $V_1(t)$, $V_2(t)$, $V_3(t)$.

According to a first aspect of the invention, and as shown in FIG. 3, encoders 72, 74 are placed on each side of the belt. Encoder 72 generates a signal representing the synchronous speed $V_1(t)$, $V_2(t)$, $V_3(t)$. Encoder 74 generates a signal representing the asynchronous speed $V_4(t)$ beneath the print bar 34A. The signals are sent to an error generator 75 in the electronic subsystem (ESS) 38 and an error signal ΔV is produced. ESS 38 contains the control electronics which prepare and manage the image data flow between the image video data source and the print bars. This error signal is used to control the write pulse time signals to print bar 34A, via driver 80, so that all the scan lines, following the first lead edge registration line, are laid down with the same line spacing as the scan lines formed at print bars 29A, 30A, 32A. In other words, the scan lines for each of the four image frames will be in perfect registration with the interscan line distances D being the same.

As an example, assume that the instantaneous scan line spacing in the image formed by print bar 30A (image frame $I_2$) is a distance $D(t)$, $D(t)$ defined by the expression $V_2(t)T$, where T is the time between the data write pulses to the print bar. By the above description, since $V_1(t) = V_2(t) = V_3(t)$ and where T is equal for each print bar, the scan line to line spacing for each image frame formed by print bars 29A, 30A, 32A, will be variable but the relative line placement frame to frame will be constant between imagers. Therefore, frames $I_1$, $I_2$, $I_3$, are now registered. However, the scan line spacing distance for the image frame formed by print bar 34A will be $D'(t) = V_4(t)T$. $D'$ will have different scan line spacing due to the non-periodic motion of the belt on the non-tensioned side. If uncorrected, the image formed by print bar 34A would have scan lines with an error of $[D - D']$, since $V_4(t)$ is not equal to $V_1(t)$, $V_2(t)$, $V_3(t)$. Encoder 72 generates a signal representing $V_1(t)=V_2(t)=V_3(t)$ and sends the signal to error generator 75. Encoder 74 generates a signal representing $V_4(t)$ and sends the signal to generator 75. An error signal $\Delta V$ is generated, representing the difference between $V_1(t)$, $V_2(t)$, $V_3(t)$ and $V_4(t)$. This error signal is used to control the write pulse time of print bar 34A at driver 80 so that each scan line is laid down so as to make each $D'=D$.

For the embodiment shown in FIG. 3, all of the imagers were print bars whose operation can be characterized as asynchronous; i.e. the time between write pulses can be varied, unlike a polygon ROS system where the time between lines cannot easily be varied. Other embodiments utilizing the principles of the present invention are possible where synchronous imagers, such as a polygon ROS, are used in conjunction with an asynchronous imager such as an LED print bar. Thus, in FIG. 2, imaging stations 29, 30, 32, instead of including print bars, could include ROS polygon systems, driven in synchronism by well-known means to form the scan lines at the associated image frames, each scan line being formed with the same interscan line distances D. Each of the scan lines would have the same scan spacing. Imaging station 34 would be maintained as the asynchronous LED print bar and would be driven by error signals $\Delta V$ to write lines which would have the same interscan line spacing D as that set by the ROS.

Figure 4:
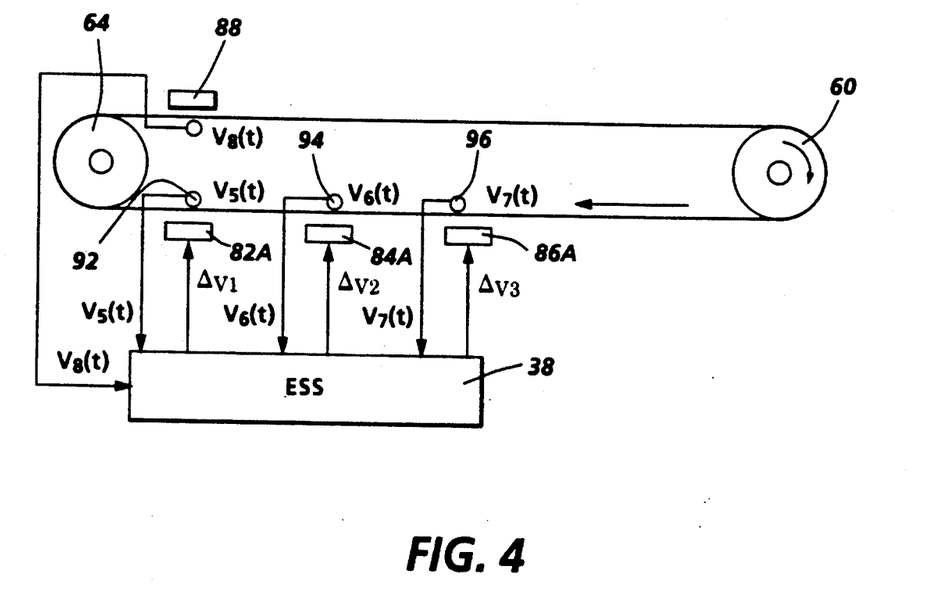
FIG. 4 shows a second embodiment of the invention.

Other variations of the printing system shown in FIG. 3 are possible. For example, as shown in FIG. 4, multiple imaging stations 82, 84, 86, each station comprising LED print bar 82A, 84A, 86A, respectively, and an associated lens array (not shown) are placed on the non-tensioned side of the belt. Each station has its own encoder, 92, 94, 96. Imaging station 88 could comprise either a polygon ROS or an LED print bar. With either system, the scan line in the associated image frame will be formed with a scan line spacing D, dependent on the known speed $V_8(t)$. Each asynchronous LED print bar 82, 84, 86, forms images on the belt which travel at speeds $V_5(t)$, $V_6(t)$, $V_7(t)$, as measured by encoders 92, 94, 96, respectively. From the above, $V_5(t) \neq V_6(t) \neq V_7(t) \neq V_8(t)$. Error signals $\Delta V_1(t)$, $\Delta V_2(t)$, $\Delta V_3(t)$, respectively, are generated, as described above for $\Delta V$, unique to each print bar and each print bar is operated by the associated driver circuits (not shown), so as to write the scan lines in the associated image frame with the same line-to-line distance D as that formed by the imager 88 so as to be in registration, therewith.

Figure 5:
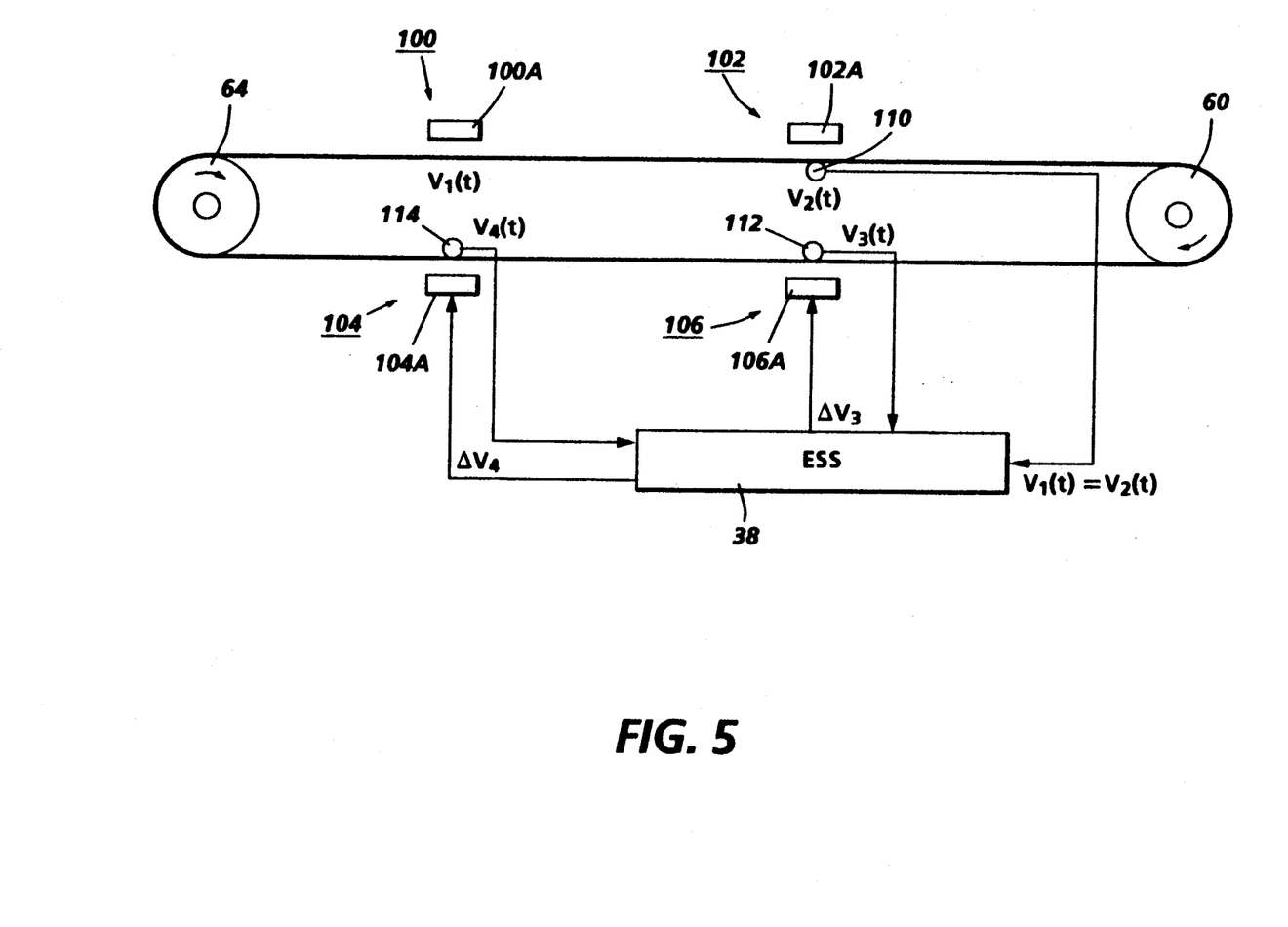
FIG. 5 shows a third embodiment of the invention.

FIG. 5 is another alternative embodiment wherein imager 100 comprising a polygon ROS 100A, and imager 102 comprising an LED print bar 102A. ROS 100A and imager 102 are positioned such that $V_1(t)=V_2(t)$. The LED print bar 102A will be operated at the scan rate set into ROS 100, so that the scan lines formed in the associated image frame will have the same scan spacing. Imagers 104, 106 comprise print bars 104A, 106A, operated asynchronously as described above to write the imaging scan lines in registration with those of stations 100, 102. Encoder 110 provides signals representing belt speed $V_1(t)=V_2(t)$. Encoder 112 provides signals representing velocity $V_3(t)$; encoder 114 provides signals representing velocity $V_4(t)$. Error signals are generated as described above and are used to control the pulse write time for print bars 104A, 104B.

Figure 6:
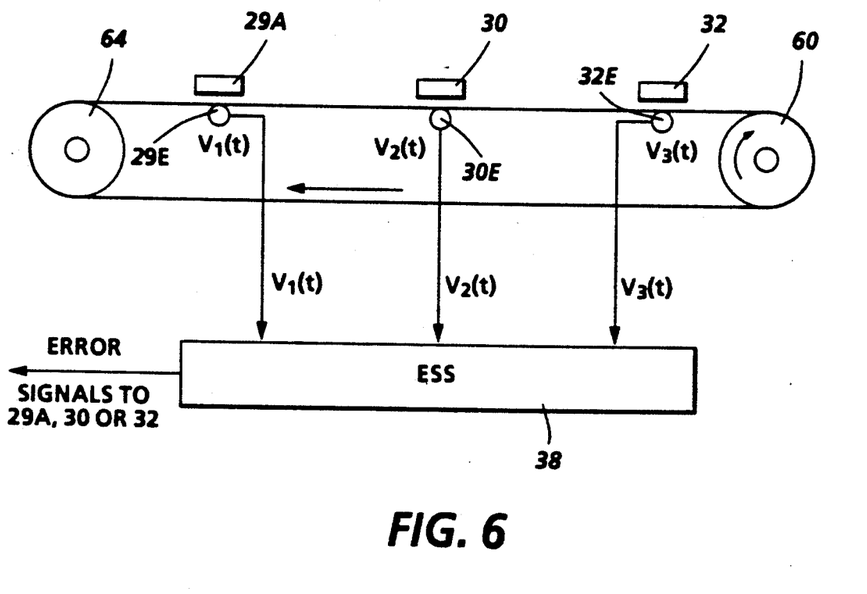
FIG. 6 shows a fourth embodiment of the invention.

While the above examples were described based on the assumption that the image stations on the top surface of the belt were spaced apart an integer multiple of the drive roller circumference, the invention can also be used in a system where, for example, the image stations 29, 30, 32, shown in FIG. 2, form images not so spaced. For this situation, shown in FIG. 6, $V_1(t) \neq V_2(t) \neq V_3(t)$. The belt speed at each imaging station would be measured by its own separate encoder 29E, 30E, 32E. If any one of the imagers were synchronous in operation (e.g. a polygon ROS), the asynchronous imagers (the LED print bars) would be operated to register scan lines with those of the ROS. If all the imagers were print bars, one bar would be selected as the reference, and the remaining three operated so as to be in scan line registration with the print bar. It is understood that for this embodiment, all of the imagers may be on one side or the other, or may be located on both sides.

While the invention has been described with reference to the structure disclosed, it will be appreciated that numerous changes and modifications are likely to occur to those skilled in the art, and it is intended to cover all changes and modifications which fall within the true spirit and scope of the invention. For example, while the preferred asynchronous image has been represented as an LED print bar, other print bars such as a liquid crystal display (LCD) bar can be used instead. Also, while the embodiments shown use a horizontal belt architecture, the invention lends itself to orientation of a belt in a vertical plane. For example, the FIG. 5 embodiment, if rotated 90°, enables a vertical architecture which may be attractive for printers housed in locations which are constrained as to printer width size.

What is claimed is:

1. An imaging system for forming multiple registered latent images on a photoreceptor belt in a single pass comprising:

means for driving the belt around at least a drive roller having a circumference C and a tension roller thereby creating a tensioned and non-tensioned surface of the belt, at least one imaging station located on each said tensioned and non-tensioned surface of the belt, each imaging station including an imager which is addressed by video data signals to form a plurality of image scan lines across the surface of the photoreceptor moving therepast at a characteristic speed, at least one of said imagers comprising a print bar capable of asynchronous operation located adjacent the non-tensioned surface, means for comparing belt speed at each of said imaging stations and for generating a signal representing the difference between said signals, and control means for varying the write pulse time of said print bar so that said scan lines formed by said print bar are in registration with the scan lines formed by the imagers on the tensioned side of the belt.

2. The imaging system of claim 1 wherein said means for comparing said belt speeds include belt encoders which generate output signals representing the belt speed at each of the imaging stations.

3. The imaging system of claim 2 wherein said control means includes means for comparing said encoder output signals and for generating an error signal which is used to control the operation of said print bar to form said registered lines.

4. The imaging system of claim 1 wherein said belt speed on the tensioned side of the belt varies with a period equal to the circumference C of the drive roller and wherein each imaging station located on the tensioned side of the belt at a separation equal to an integer multiple of C.

5. The imaging system of claim 4 wherein the belt speed at each of said imaging stations on the tensioned side of the belt are equal.

6. The imaging system of claim 5 wherein one encoder is used to generate an output signal representative of all the imagers on the tensioned side of the belt and a separate encoder is used to generate outputs representing belt speeds at each imager on the non-tensioned side of the belt.

7. The imaging system of claim 2 wherein at least one of said imagers on said tensioned side comprises a polygon ROS.

8. The imaging system of claim 1 wherein said belt is oriented in a vertical plane.

9. The imaging system of claim 1 wherein one of said imagers forms an exposure image which is developed with a black toner and the other imagers form exposure images which are developed with a color toner.

10. An imaging system for forming multiple, registered latent images on a photoreceptor belt in a single pass comprising:
    means for driving the belt around at least a drive roller having a circumference C and a tension roller creating a tensioned and non-tensioned surface of the belt,
    a plurality of imaging stations located on said tensioned side of the belt, each imaging station forming a lead edge registered image frame, each frame comprising a plurality of scan lines separated by interscan line distance, each imaging station separated from each other by a distance which is not equal to a distance NC where N is an integer,
    means for comparing the belt speed of each of said imaging stations and for generating a signal representing the difference between said signals,
    a plurality of belt encoders, each imaging station having a separate encoder, each encoder generating output signals representing the belt speed at each of said associated imaging stations, and
    means for comparing the output signals of each encoder and for generating an error signal which is used to control the operation of each of said imaging stations to form image frames having scan lines which are in registration.

11. An imaging system for forming multiple image exposure frames on a photoconductive member during a single pass including:
    a photoreceptor belt adapted to accommodate the formation of an integral number of image exposure frames, each said exposure frames comprising a plurality of scan lines forming said image,
    a plurality of imagers, each imager associated with the formation of one of said image exposure frames, at least one of said imagers comprising an asynchronous print bar,
    means for comparing the speed of the belt moving past each imager and for generating an error signal representing the speed difference therebetween, and
    control means for operating at least said asynchronous print bar so that the scan lines formed by said asynchronous imager are in registration with the scan lines of the other of said plurality of images.

12. An apparatus for forming multiple image exposure frames on a photoreceptor belt moving in a process direction during a single pass including:
    means for moving the belt in said process direction, said means including at least a motor driven drive roller and a tension roller thereby creating a tensioned and non-tensioned side of the belt, the tensioned side having a speed at any point determined by the periodic runout of the drive roller,
    a plurality of linear image print bars each print bar associated with the formation of one of said exposure frames, at least one of said print bars associated with the formation of an imaging frame on said non-tensioned side of the belt, and
    control means for sensing and comparing the speed of the belt at each of the print bars and for controlling operation of the print bar on the non-tensioned side of the belt so that the scan lines formed by the non-tensioned side imagers are registered with the scan lines formed by the print bars located on the tensioned side of the belt.

* * * * *